United States Patent [19]
Jones

[11] Patent Number: 5,993,077
[45] Date of Patent: Nov. 30, 1999

[54] STAND ASSEMBLY FOR AN OPTICAL DEVICE

[76] Inventor: Steven P. Jones, 5507 Moultrie Rd., Springfield, Va. 22151

[21] Appl. No.: 08/692,381

[22] Filed: Aug. 5, 1996

[51] Int. Cl.⁶ .............................. G03B 17/00; F16M 11/04
[52] U.S. Cl. ......................................... 396/428; 248/187.1
[58] Field of Search ..................... 396/419, 428; 248/168, 179.1, 187.1

[56] References Cited

U.S. PATENT DOCUMENTS

| | | | |
|---|---|---|---|
| 2,353,513 | 7/1944 | Simmon | 88/24 |
| 2,667,825 | 2/1954 | Nicholas . | |
| 2,713,609 | 7/1955 | Niklason . | |
| 2,813,456 | 11/1957 | Ostrov . | |
| 3,601,028 | 8/1971 | Tertocha . | |
| 3,709,119 | 1/1973 | Van Der Meer . | |
| 3,742,835 | 7/1973 | Bahnsen | 95/86 |
| 3,804,356 | 4/1974 | Olds | 248/179 |
| 3,833,196 | 9/1974 | Protzman | 95/86 |
| 4,133,607 | 1/1979 | Mansho . | |
| 4,219,268 | 8/1980 | Uchida . | |
| 4,222,654 | 9/1980 | Bodenhamer . | |
| 4,269,499 | 5/1981 | Frankel | 354/293 |
| 4,648,698 | 3/1987 | Iwasaki | 354/293 |
| 4,899,189 | 2/1990 | Frost . | |
| 5,360,194 | 11/1994 | Jacobson | 248/431 |
| 5,384,609 | 1/1995 | Ogawa et al. | 354/81 |
| 5,390,885 | 2/1995 | Shen | 248/168 |
| 5,761,539 | 6/1998 | Foley et al. | 396/1 |
| 5,791,623 | 8/1998 | Louridas | 248/451 |

FOREIGN PATENT DOCUMENTS

| | | |
|---|---|---|
| 4-284435 | 10/1992 | Japan . |
| 2 196 755 | 5/1988 | United Kingdom . |

*Primary Examiner*—Safet Metjahic
*Assistant Examiner*—Christopher E. Mahoney
*Attorney, Agent, or Firm*—Neil F. Markva

[57] ABSTRACT

A stand assembly maintains an optical device at a location spaced from a stand assembly supporting surface wherein the optical device includes a lens system and a longitudinal image axis extending through an objective lens disposed at a distal end of the lens system. The stand assembly comprises a support base member, a plurality of leg members each having one end thereof mounted to one side of the support base member. The support base member is effective to carry the optical device on a side opposite the leg members. The base member includes a device support surface on the side opposite the leg members, and has two opposed outer free end sections and two opposed edge portions extending along the device support surface. Each leg member includes at an outer free end thereof a foot that defines a footprint therebetween when the stand assembly is disposed in a free-standing condition on a stand assembly surface The stand assembly is effective to support the optical device on the device support surface and to suspend the objective lens over one of the opposed edge portions of the support base member.

20 Claims, 5 Drawing Sheets

STAND ASSEMBLY FOR AN OPTICAL DEVICE

FIELD OF THE INVENTION

The present invention relates to a stand assembly system for supporting an optical device at a location spaced from a stand assembly supporting surface. More particularly, the invention is directed to a stand assembly that may be used for close-up photography with a camera having an adjustable lens system.

BACKGROUND OF THE INVENTION

Prior art support stands are designed to support fixed lens cameras and cannot support modern cameras equipped with autofocus or zoom lens. The prior art devices feature a threaded adaptor ring that attaches directly to the lens of the camera and holds the camera in a vertical position so that the longitudinal image axis of the lens is perpendicular to and spaced from a flat surface supporting the object being photographed in the field of view of the camera. Known copy stands have a small footprint, which prevents photographing any area larger than about 7×10 inches. An 8½×11 inch document has a diametric dimension from corner to corner of 14 inches. Thus, with the known stand assemblies, it is impossible to photograph letter sized documents having standard dimensions of 8½×11 inches. And even if a camera were available, the resultant picture would include a portion of the supporting stand legs.

A number of camera manufacturers including Cannon, Pentax, and Olympus provide camera support stands designed for use with fixed focal length lens systems. Modern lens systems for photographic cameras are designed to move during the focus or zoom process. And a camera supported by the lens on known photographic stand assemblies tend to drift during use. Gravity tends to pull the lens elements toward the object being photographed causing focus problems. When this occurs with a zoom lens, a change in the image size occurs. And tiny motors in modern autofocus lens systems are adversely effected by the resistance to longitudinal movement, rotational motion, or pressure on the lens. The resistance is caused by the weight of the camera when the lens itself is directly connected to the stand assembly.

For the foregoing reasons, these known stands are not adaptable to an autofocus lens, which is a relatively new product to the amateur and professional photographic market.

The following U.S. Patents disclose various types of camera stand devices that support a camera by its body portion.

| | | |
|---|---|---|
| 2,667,825 | 3,601,028 | 4,219,268 |
| 2,713,609 | 3,709,119 | 4,222,654 |
| 2,813,456 | 4,133,607 | 4,899,189 |

U.S. Pat. Nos. 3,601,028; 3,709,119; and 4,219,268 disclose various types of support stands useful in proximity or close-up photography. Each of these support provides a close-up camera for photographing subjects on a horizontal surface. The stand shown in U.S. Pat. 3,709,119 is specifically designed for a particular type of close-up camera, which is useable only on a flat horizontal surface. The stands of U.S. Pat. Nos. 3,601,028 and 4,219,268 are directly connected to the fixed lens of a standard camera and include three telescoping legs. FIG. 3 of U.S. Pat. No. 2,667,825 discloses a means for movably mounting a camera on two laterally spaced rod members for focusing the camera supported above a substantially flat horizontal surface.

U.S. Pat. No. 4,222,654 discloses a system having a plurality of adjustable legs connected to an L-shaped base member to which a camera body may be fixedly mounted while allowing free adjustment of the camera lens. This camera support system is used for photography in electron microscopy, nuclear medicine, and in the application of ultrasonics in medical clinical techniques. This prior art stand is limited to taking pictures of the display on a cathode ray tube while maintaining the camera in a stable condition and is incapable for photographic use in the field of forensics.

None of the devices shown in the foregoing patents overcome the basic disadvantages associated with supporting autofocus or zoom lens structures. Consequently, none of the known stand assemblies may be used for close-up photography as is the device of the present invention.

THE PURPOSE OF THE INVENTION

The primary object of the invention is to provide a stand assembly for holding a photographic camera having an autofocus or zoom lens at a fixed location spaced from a supporting surface on which the stand assembly is disposed.

Another object is to provide a stand for supporting a camera in virtually any angle with respect to and in a free-standing condition on a horizontal surface while maintaining the photographic camera in a steady and stable condition on either flat or uneven surfaces.

A further object of the invention is to provide a stand assembly for holding a camera to photograph an 8½×11 inch document placed on a horizontal surface without including any portion of the stand assembly in the resultant photograph.

Another object is to provide a stand assembly for a variety of optical devices used by field photographers in law enforcement, biologists, botanists, document examiners, and for collecting scientific evidence in and away from their particular laboratory environments.

A still further object of the invention is to provide a lightweight, portable, and rugged stand assembly which may be disassembled for storage in a standard camera bag, briefcase, or desk.

Another object of the invention is to provide a stand assembly for an optical device having its objective lens pointed in any direction with respect to the stand without the stand tipping when in a free-standing condition on a stand assembly supporting surface.

A further object of the invention is to provide an optical device support stand for mounting various accessories such as a black-out drape to prevent extraneous light for effecting artificial illumination, a diffusion drape for diffusing both incident and ambient light, support brackets for various camera bodies, and lighting support brackets.

Another object of the invention is to provide an optical device stand assembly that is useful in the field of forensics photography for collecting evidence at a crime scene, documentation of evidence in the laboratory, or training personnel in the classroom.

A still further object of the invention is to provide an optical device support stand which is used with a) night vision equipment that requires a solid platform for viewing under low light conditions, b) spotting scopes, telescopes, and binoculars in the field by bird watchers, shooting enthusiasts, and sportsmen, and c) in the laboratory to support large magnifying glasses often used by electronic component assemblers, d) by the elderly or individuals with poor vision to support magnifiers while reading or writing, e) with video cameras in the laboratory or in the field for surveillance, and f) for photography requiring long focal length lens such as 500 mm or 1000 mm lens or telephoto lens that may be positioned to counter-balance the lens with the camera while providing stability for photography or viewing.

Still another object of the invention is to provide a standing assembly that offers easy access to the lens system of a camera for making mechanical settings for viewing and where the film may be quickly loaded or unloaded in any position while the camera remains mounted on the stand.

SUMMARY OF THE INVENTION

The stand assembly of the invention comprises base means, a plurality of leg members each having one end thereof mounted to one side of the base means, and optical device mounting means for mounting a said optical device to a side of the base means opposite the leg members. The base means includes device support surface means on the side opposite the leg members, two opposed outer free end sections, and two opposed edge portions extending along the device support surface means. The longitudinal image axis of the lens of an optical device intersects either a film, eye viewing piece, or an electronic sensor in the particular optical device being used. The image axis always goes through the center of the lens for the particular optical device.

Each leg member includes at an outer free end thereof foot means for defining a footprint between the leg members The optical device mounting means is effective to support an optical device on the device support surface means and to suspend the objective lens means of the optical device over one of the opposed edge portions of the base means when the stand assembly is disposed in a free-standing condition on a stand assembly supporting surface. The footprint of the stand of this invention matches a variety of wide angle lenses used with a photographic camera. A zoom lens allows focusing on a small selected portion of a document or a credit card, for example. And the various lenses may be changed without removing the camera from the stand assembly of the invention.

The optical device mounting means may be adjustable or fixed with respect to the base means. The adjustable optical device mounting means includes universal pivotable coupling means for connecting a said optical device to the device support surface means above a device support mounting plane when the stand assembly is in a free-standing condition on a stand assembly supporting surface. The universal pivotable coupling means includes a first mount section secured to the device support surface means and a second mount section pivotally connected to the first secured mount section. The second mount section includes means for detachably connecting a said optical device to the universal pivotable coupling means.

The device support surface means defines a device support mounting plane above which the optical device is suspended. The mounting means is effective to suspend the distal end of the optical device over an edge portion of the base means for disposing its objective lens means below the device support mounting plane. More specifically, the objective lens is suspended over one of the opposed edge portions to intersect the assembly footprint with the longitudinal image axis of the optical device when the stand assembly is disposed on a stand assembly supporting surface. The stand assembly of the invention is capable of supporting in a stable condition a variety of optical devices including a photographic camera, a telescope, binoculars, a gunsight, a spotting scope, a medium format camera, a night vision equipment, or a video camera.

The stand assembly of the invention may be used to provide stable support of a camera for taking pictures of objects located on a vertical wall such as may be found at a crime scene. In addition, the stand assembly is adaptable to taking overlapping photographs over a large surface area. For example, the assembly with camera attached may be readily moved and held for stable photography along a map disposed on a flat surface and at any angle with respect to the horizontal.

Regardless of the optical device or optical device mount used with the stand assembly of the invention in a free-standing condition on a substantially horizontal supporting surface, the center of gravity of the optical device will always be within the footprint of the assembly to provide free-standing stability regardless of its position on and location of the supporting surface. That is, the center of gravity of the optical device will always be along an axis that will intersect a substantially horizontally disposed footprint of the stand assembly.

In a specific embodiment, the base means includes an intermediate optical device carrying section located between two opposed outer free end sections. The intermediate carrying section has an optical device connecting point located between the two opposed outer free end sections and in a connecting point plane that is perpendicular to a device support mounting plane. The connecting point plane is between the two opposed edge portions of the base means and intersects the footprint. The mounting means is effective to support the optical device on the intermediate carrying section above the mounting plane. The leg members extend outwardly from the base means below the mounting plane.

The two opposed outer free end sections each includes a projecting end portion which projects outwardly from the intermediate carrying section and outwardly from one of the opposed edge portions of the base means. Each projecting end portion includes a free end located to one side of the connecting point plane. The base means has a structural configuration including a base plan shape of a U, H, V, X, or I when viewed in a direction normal to the device support mounting plane.

A leg member extends outwardly from each free end of the projecting end portions and in a direction extending below and transverse to the mounting plane. The leg members are substantially identical to each other with respect to their length and width dimensions, and structural configurations. In a specific embodiment, the leg members are removably mounted to the base means and each leg member includes telescoping means for adjusting its respective length dimension.

When the optical device is a photographic camera having a body portion and a long focal length lens means or telescopic zoom lens, the optical device mounting means includes means for attaching the body portion of the camera to the intermediate carrying section with the lens means projecting between the two opposed edge portions and below the mounting plane.

In a specific embodiment, base means includes device support surface means that defines a device support mounting plane, an optical device intermediate carrying section located between two opposed outer free end sections, and two opposed edge portions extending along the device support mounting means. Four leg members each has one end thereof mounted to one side of the base means and, at an outer free end thereof, includes foot means to define a footprint therebetween when the stand assembly is disposed in a free-standing condition on a stand assembly supporting surface. Optical device mounting means is effective to mount an optical device to the side of the base means opposite the leg members and is further effective to support the optical device on and outwardly from the device support surface means. The objective lens means is suspended over one of the opposed edge portions of the base means and between the two outer free end sections.

In a specific embodiment, the intermediate carrying section includes an optical device connecting point located between the two opposed outer free end sections and in a connecting point plane that is perpendicular to the device support mounting plane The connecting point plane is also between the two opposed edge portions of the base means and intersects the footprint defined by the foot means of the leg members. The mounting means is effective to support the optical device on the intermediate carrying section above the mounting plane and the leg members extend outwardly from the base means below the mounting plane. Each leg member is removably mounted to a respective outer corner leg coupling surface disposed on the base means. The base means includes at least a portion that has a U-shaped or V-shaped base member plan configuration as in a respective H-shaped or X-shaped base member when viewed in a direction normal to the device support mounting plane.

When a photographic camera having an adjustable lens means is supported on the stand assembly of the invention, the lens means projects outwardly from a camera body portion for providing a selected focal length to photograph an object located in a field of view within the footprint without obtaining an image of the foot means in a resultant photograph taken when the camera is secured to the assembly.

The stand assembly of the invention is more versatile than any known device in that it is lightweight, has removable legs and is dimensioned to fit in any bag that may contain the optical device being used with the stand assembly. It is more versatile than known tripods and support stands as to the number of cameras and other optical devices which may be used with it to view or take photographs under very stable conditions regardless of the field environment.

The versatility of the stand assembly makes it very useful as a tool for forensic use and law enforcement or military applications for field photography. A researcher in the field can merely view or take pictures of animal or plant life, or rocks on the beach or on any other type of terrain or for any other scientific application.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
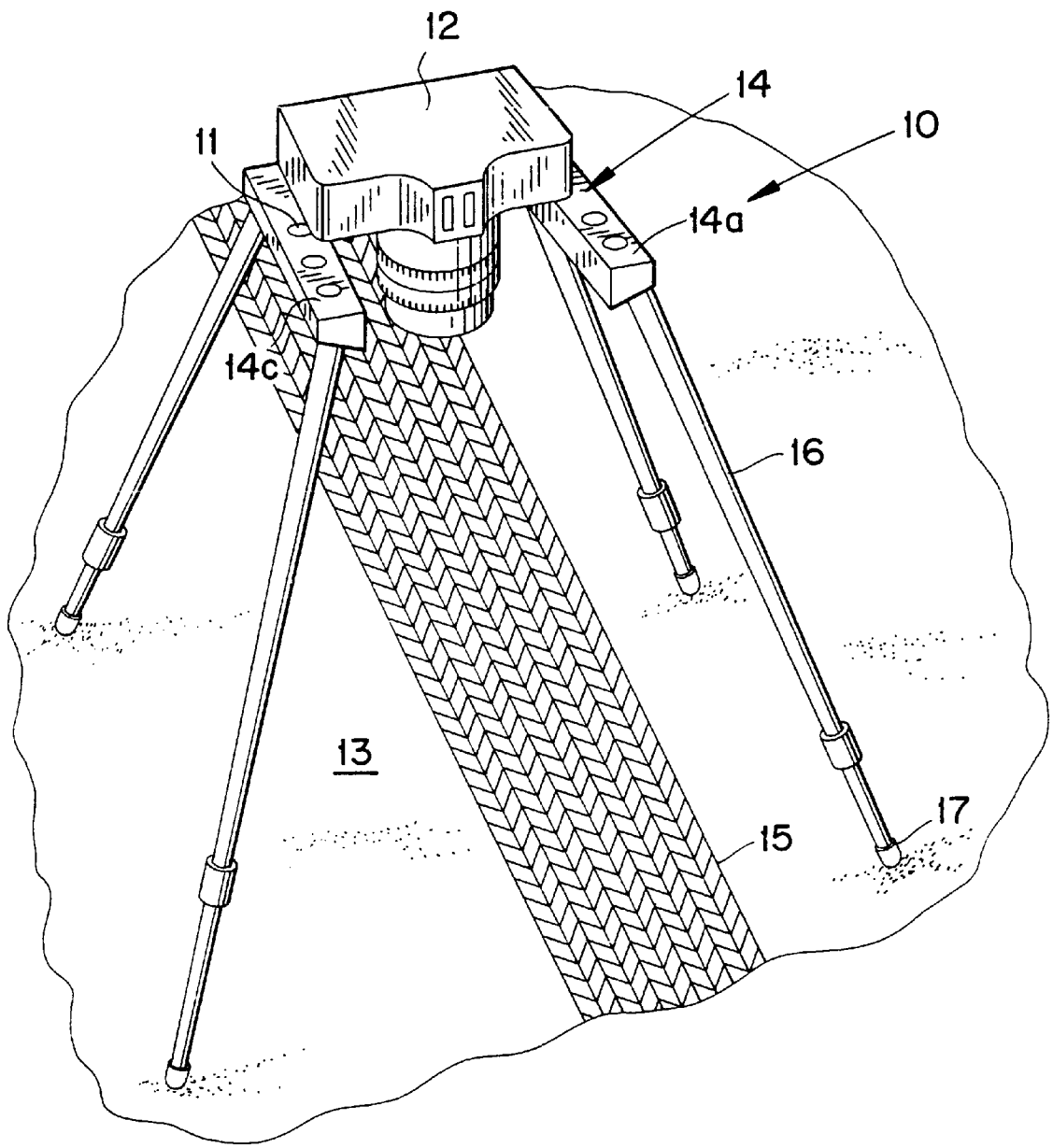
FIG. 1 is a perspective view of the stand assembly of the invention in use with a photographic camera on uneven terrain.

The stand assembly, generally designated 10 in FIG. 1, is useful for maintaining an optical device at a location spaced from a stand assembly supporting surface 13. In this specific embodiment, a universal pivotable ball mount, generally designated 20 (FIG. 2), mounts a camera 12 to project outwardly from a top side of base member 14 opposite leg members 16 which, as shown, have one end thereof mounted to project outwardly from a bottom side of base member 14. Foot members 17 of the four leg members 16 define a footprint 18 therebetween. Telescoping leg members 16 have different lengths to provide a stable supporting condition on uneven terrain for camera 12 to produce a clear picture of a tire track 15 at an investigative scene in the field. The footprint of the stand assembly of the invention is about 13 to 14½ inches wide and about 15 to 16 inches long. Stand assembly 10 thus demonstrates its unique capabilities for use in forensics and evidence gathering in the field.

Device support base member 14 comprises two opposed outer free end sections 14a and 14c and an intermediate optical device carrying section 14b located therebetween. Intermediate carrying section 14b includes an inner or front edge portion along the inside of the U-shaped configuration and an outer or rear edge portion located along the outside of U-shaped base member 14. The two opposed edge portions extend along the device support surface 14d extending across the two outer free end sections 14a and 14c and intermediate carrying section 14b.

Universal pivotable ball mount 20 supports camera 12 or any other optical device on and outwardly from device support surface 14d (FIG. 5) and suspends the objective lens means of camera 12 over one of the opposed edge portions of base member 14.

Ball mount 20 has a first mount section 20a secured to device support surface 14d and a second mount section 22 pivotally connected to first mount section 20a using a commonly known universal ball joint connection. Tightening handle 24 is connected to a threaded member having an inner end that tightens against the universal ball of first mount section 20a as is well known. Second mount section 22 is shown in dotted form in the position required to suspend camera 12 over an inner edge portion of support base member 14 as shown in FIG. 1. Handle 24 rotates counter-clockwise to loosen the ball joint allowing mount section 22 to pivot to any desired angle with respect to mounting plane 32.

Figure 2:
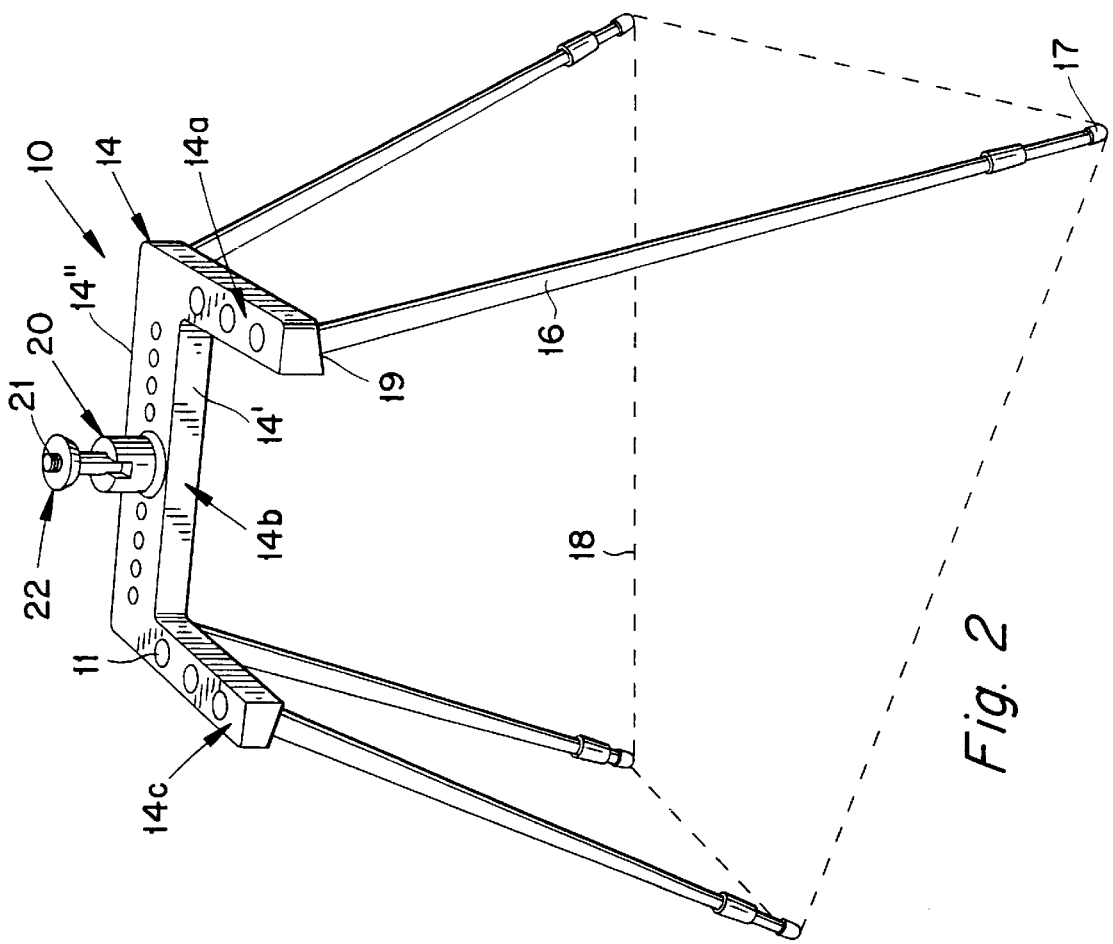
FIG. 2 is a perspective view of the stand assembly of FIG. 1 having a pivotable optical device mounting mechanism.

Commercially available pivotable ball mount 20 is disposed at an optical device connecting point located on the intermediate carrying section 14b between outer free end sections 14a and 14c. The connecting point is also located in a connecting plane 31 (FIG. 5) that is perpendicular to device support mounting plane 32 defined in this specific embodiment by device support surface 14d. Connecting point plane 31 is located between the two opposed edge portions of base member 14 and intersects footprint 18, which is defined between foot members 17 as shown in FIG. 2. Camera 12 is supported on intermediate carrying section 14b above the device support mounting plane 32 with leg members 16 extending outwardly from base member 14 and below mounting plane 32.

Camera 12 mounted to universal ball mount 20 has a body portion and a long focal length lens system Ball mount 20 includes a standard one-quarter inch diameter threaded mounting stud 21 having 20 SAE standard threads, which engage the standard ¼ inch diameter 20 SAE threaded bore in the camera mounting block located on the body portion of camera 12. As is evident in FIGS. 1 and 5, the body portion of camera 12 is thus attached to intermediate carrying section 14b at a location between the front edge portion defined by outer side 14' and the rear edge portion defined by outer side 14". Thus, the front and rear edge portions are disposed on and a part of opposed outer sides 14' and 14" of section 14b (FIG. 5) with the camera objective lens projecting below device support mounting plane 32 between free end sections 14a and 14c as shown in FIG. 1. The longitudinal image axis of camera 12 extends through the objective lens disposed at a distal end of the lens system and intersects footprint 18 when the camera lens system is disposed between end sections 14a and 14c as shown in FIG. 1.

The mounting blocks commonly used on optical devices have a standard ¼ inch bore with 20 SAE threads. Consequently, unlike other supporting stand assemblies, this specific embodiment with mount pin 21 is capable of supporting a 35 mm camera, a video camera, binoculars, night vision equipment such as a night viewing vision device, a medium format camera, a telescope, a gunsight, Polaroid cameras or any other type of optical device having such a standard mount.

The shape of footprint 18 is determined by the placement of foot members 17 with respect to support base member 14. Depending on the extension of four leg members 16, footprint 18 may be rectangular or some other four sided shape. A rectangular footprint 18 is formed when all four leg members 16 are of equal length and placed on a flat surface. Leg members 16 have a minimum length of 13½ inches when fully telescoped. A fixed length leg member without telescoping capability may also be used with base member 14.

The stability of stand assembly 10 is such that the camera 12 mounted thereon may be used on uneven terrain 13 (FIG. 1) or may be used in a laboratory situation to photograph letter sized documents located on 8½×11 sheets of paper without photographing any portion of the leg members in the process. In this specific embodiment, the stand assembly has a working footprint of 13×15 inches when leg members 16 are at the minimum extension of their length dimensions.

Figure 6:
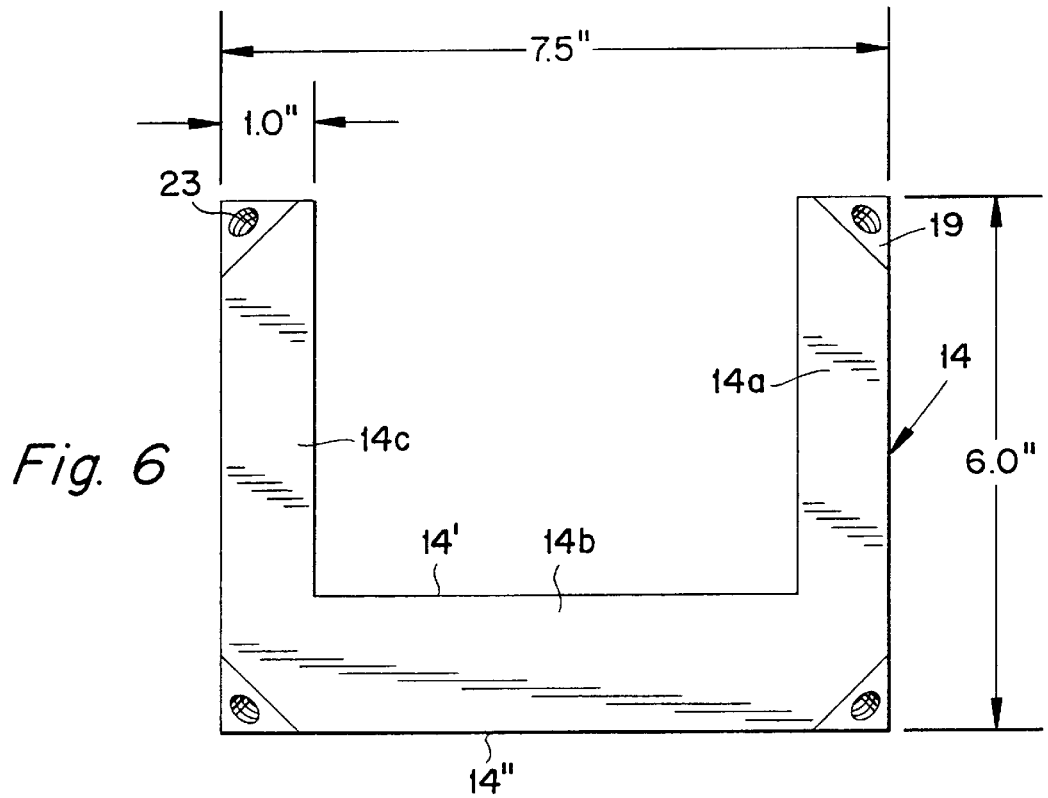
FIG. 6 is a bottom plan view of the U-shaped base member without the leg members of the stand assembly of the invention as shown in FIGS. 1 and 2.
Figure 7:
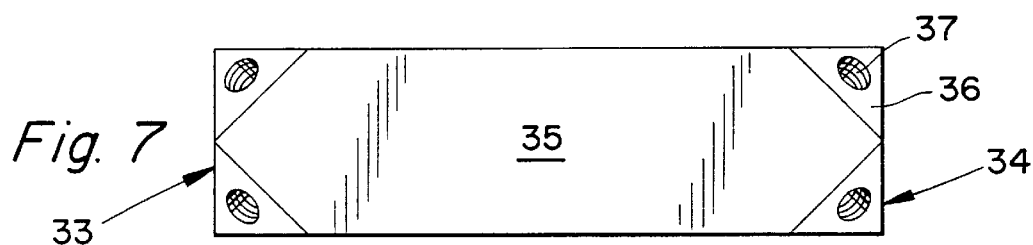
FIG. 7 is a bottom plan view of an I-shaped base member without the leg members for another embodiment of a stand assembly of the invention.
Figure 8:
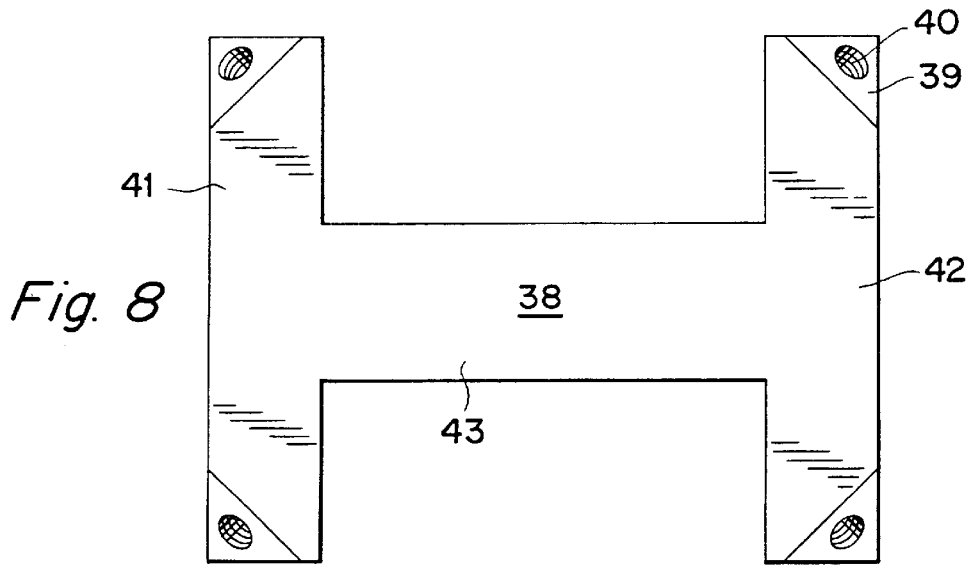
FIG. 8 is a bottom plan view of an H-shaped base member for further embodiment of a stand assembly of the invention without the leg members.
Figure 9:
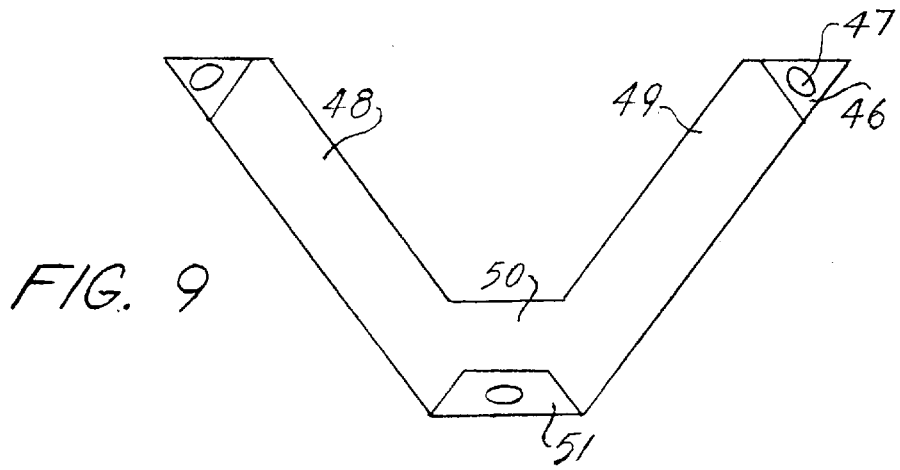
FIG. 9 is a bottom plan view of a V-shaped base member without the leg members of a still further embodiment of a stand assembly of the invention.
Figure 10:
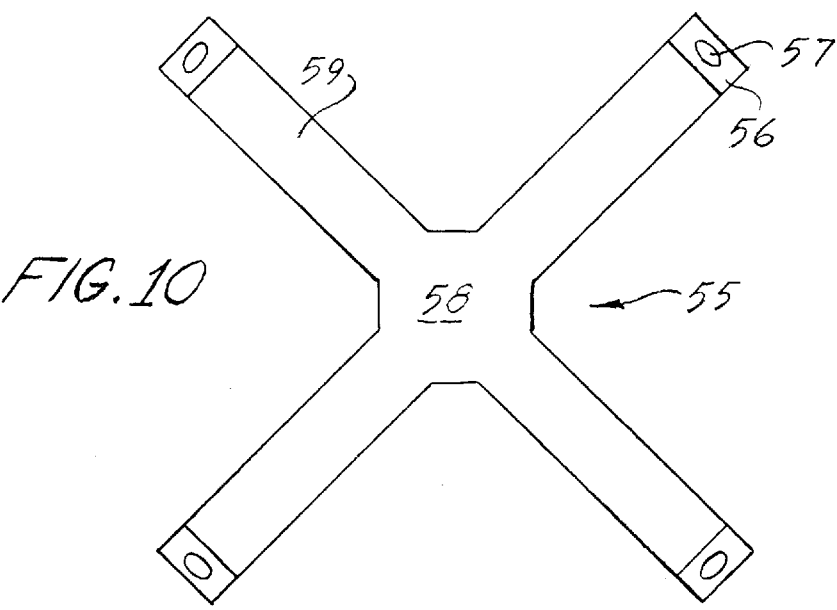
FIG. 10 is a bottom plan view of an X-shaped base member without the leg members for a fifth embodiment of a stand assembly of the invention.

Items to be photographed are easily positioned within the field of view of camera 12 to expedite photography Leg members 16 are detachably connected to outer corner leg coupling surfaces 19. Each leg 16 has a threaded spindle member (not shown) that threadingly engages the threaded openings or holes 23 (FIG. 6).

Outer end sections 14a and 14c are spaced apart an amount sufficient to allow the lens system of camera 12 to swing downwardly therebetween as shown in FIG. 1. The disposition of legs 16 on support bracket 14 allows the user to reach in between and change the aperture of camera 12 of the lenses very easily. When necessary, filters may easily be attached to camera 12. Unlike any known stand assemblies, the entire lens system may be removed and replaced without having to remove camera 12 from stand assembly 10.

Stand assembly 10 is capable of supporting modern cameras that have zoom lenses or automatic focus mechanisms built into the lenses. Unlike prior art stand assemblies which support a camera by its lens to photograph objects in a field of view located within footprint 18, no pressure is placed on the lens system of camera 12, which may also be pivoted in any direction about the pivot point with respect to mounting plane 32 as shown. An unique aspect of stand assembly 10 is that camera 12 may be suspended over either of the opposed inner and outer edge portions of respective opposed outer sides 14' and 14" while keeping the center of balance over the footprint 18 to preclude the tipping of the system when in a free-standing condition on a supporting surface.

Disposition of the connecting point along intermediate carrying section 14b is important because not all cameras have their standard mounting block located at their centers. That is, the camera mounting block may be toward one end of the camera so that the fixed connecting point on carrying section 14c to which ball mount 20 is attached may have to be changed to insure optimum placement of the longitudinal image axis of camera 12. Ball mount 20 may thus be disposed at a fixed connecting point located at any of openings 14e disposed along intermediate section 14b. In this specific embodiment, 10 holes allow ball mount 20 to be offset from the center of carrying section 14b for adapting the particular camera to the desired field of view within footprint 18. Ball mount 20 supports camera 12 on but at a distance spaced upwardly from support surface 14d to give flexibility in adjusting camera 12 to the object being photographed in a field of view located within footprint 18. In this upwardly spaced position, camera 12 is rotatable about spindle or stud 21 from about ⅜ to 1½ inch if required to effect leveling and focus on the object being photographed.

Base member 14 may be made of any desired material and various materials may be used to make the different parts. An appropriate plastic material may be used if a large number of devices are required. In this specific embodiment, however, base member 14 is composed of aluminum and holes 11 disposed along outer end sections 14a and 14c remove aluminum to lighten stand assembly 10 for portability. End sections 14a and 14c may accommodate the mounting of lights or other accessories such as a black-out drape to prevent extraneous light from affecting artificial illumination, a diffusion drape for diffusing both incident light and ambient light, and for attaching support brackets for various types of camera bodies. Lighting support brackets may be used to attach ultraviolet or infrared lights for use in forensics to investigate questioned coded documents. Credit cards or other types of documents may be coded using forensic tags for determining the authenticity of the object being photographed.

In this specific embodiment, leg members 16 are substantially identical to each other with respect to their length and width dimensions and structural configurations. In certain situations, such as in a forensic laboratory environment, it is conceivable that the leg members may be fixedly attached and have a particular fixed length. Leg members 16 have a ½ inch diameter in this specific embodiment. The telescoping or the fixed length support legs may be tube and rod configurations. The telescoping legs can be locked into positions at intermediate lengths.

Figure 5:
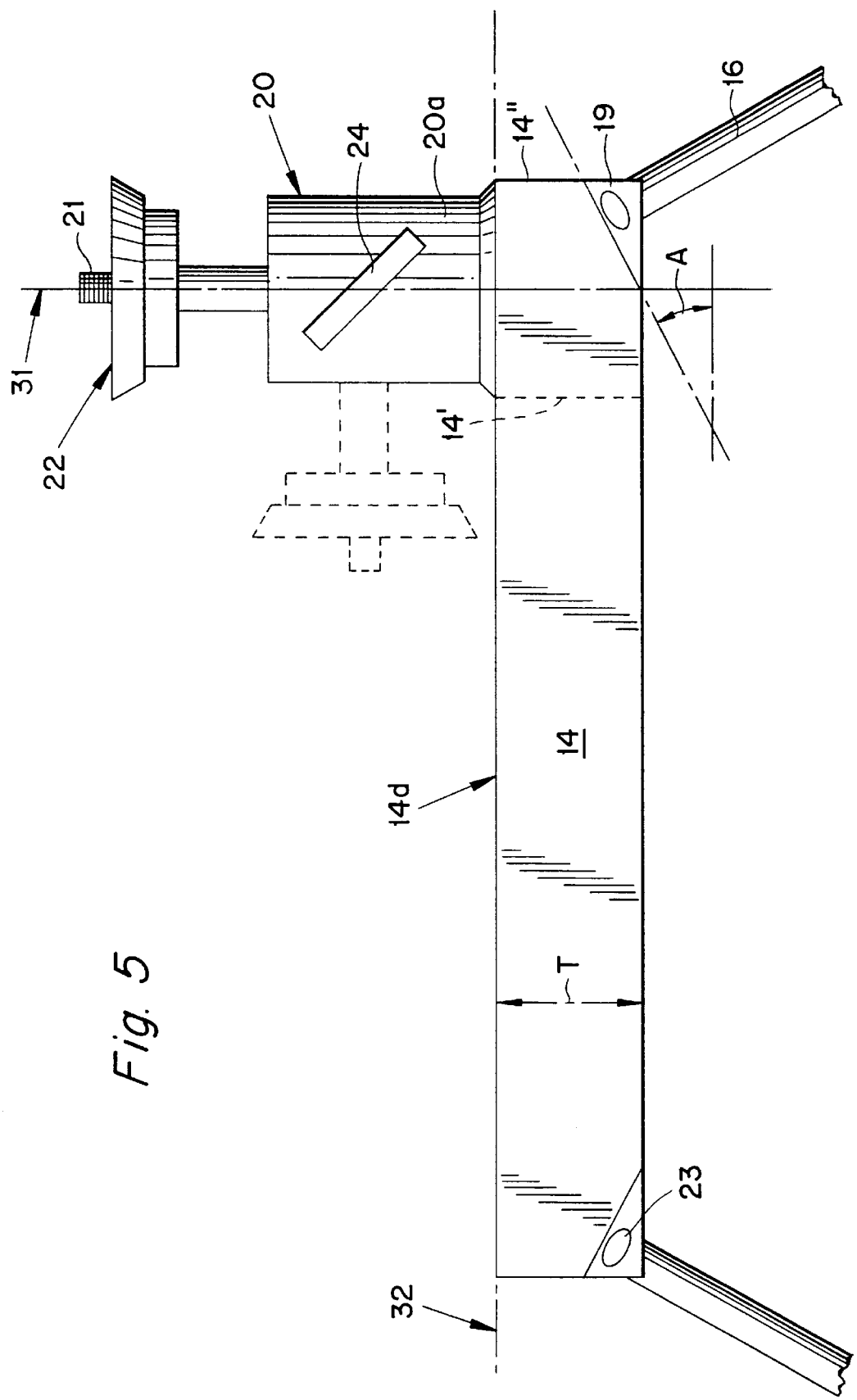
FIG. 5 is a fragmentary elevational view of the stand assembly as shown in FIG. 2.

The specific dimensions of U-shaped support base member 14 are shown in FIGS. 5 and 6. The width and thickness T of end sections 14a and 14c are about 1 inch. The outside dimension of free end sections 14a and 14c is 7½ inches, and their length 6 inches. The outer corner leg coupling surface 19 has an outer edge that is at an angle A of 20 degrees with respect to the horizontal.

Figure 3:
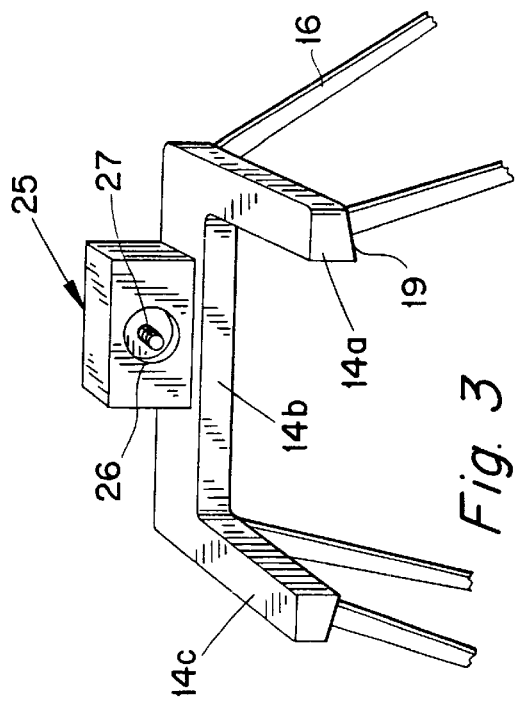
FIG. 3 is a fragmentary perspective view of another embodiment of the stand assembly of the invention having a stationary optical device mounting mechanism.

In FIG. 3, commercially available mounting block 25 fixedly secured to intermediate section 14b includes a recess portion 26, which receives the outer diameter of a standard mounting block of a camera or other optical device. A standard ¼ inch diameter 20 SAE threaded member 27 may be rotated through an opening in mounting block 25 by a knurled handle (not shown) on the rear side of block 25 for threadingly engaging and fixing the standard mounting block of a camera to direct its lens downwardly toward footprint 18.

Figure 4:
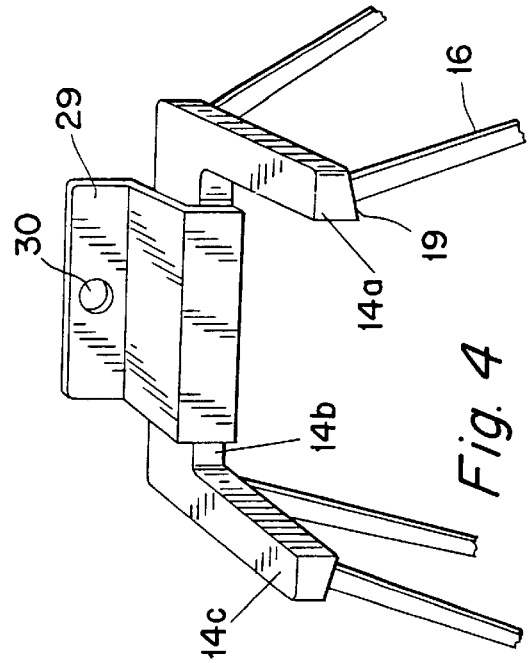
FIG. 4 is a fragmentary perspective view of a stand assembly of the invention showing a third embodiment of an optical device mounting mechanism for maintaining an optical device in a stationary position.

In FIG. 4, Z-mount bracket 29 fits over and around the front edge portion of intermediate carrying section 14b and has an upstanding portion that includes opening or recess 30 that acts in cooperation with a known fastening mechanism. The mounting block of an optical device, for example, a camera is secured to opening or recess 30 and therefore directly to Z-mount bracket 29 in a well known manner. In this Z-mount embodiment, the stand assembly is adapted to a camera that has body height of about 5 and ⅜ inches from top to bottom so that its lens is set over a front or inner edge portion of support base member 14. The camera is thus focussed directly downwardly to a "sweet spot" in the field of view within footprint 18 of the assembly. The sweet spot defines an area in which an object should be place for obtaining the best possible focus and photographic images.

FIGS. 7–10 are bottom plan views of other embodiments of base members according to the invention shown without the legs and in a direction normal to mounting plane 32. An optical device coupling mount is attached to the opposing top side (not shown) of the several base members. The I-shaped support base member 35 includes angled outer corner leg coupling surfaces 36 each including a threaded opening 37 to removably threadingly engage the threaded connecting end of a leg member at end sections 33 and 34. The H-shaped support base member 38 includes two opposed outer end sections 41 and 42 having angled outer corner leg coupling surfaces 39 including threaded leg attaching openings 40. Intermediate carrying section 43 is disposed between end sections 41 and 42. The V-shaped support base member 45 includes intermediate optical device carrying section 50 between two opposed outer free end sections 48 and 49, which include angled corner leg coupling surfaces 46 and 51 having threaded openings 47 to connect leg members. The X-shaped support base member 55 includes intermediate carrying section 58 disposed between opposed outer end sections 59 each having angled outer corner leg coupling surfaces 56 with threaded leg connecting openings 57 as shown.

Figure 11:
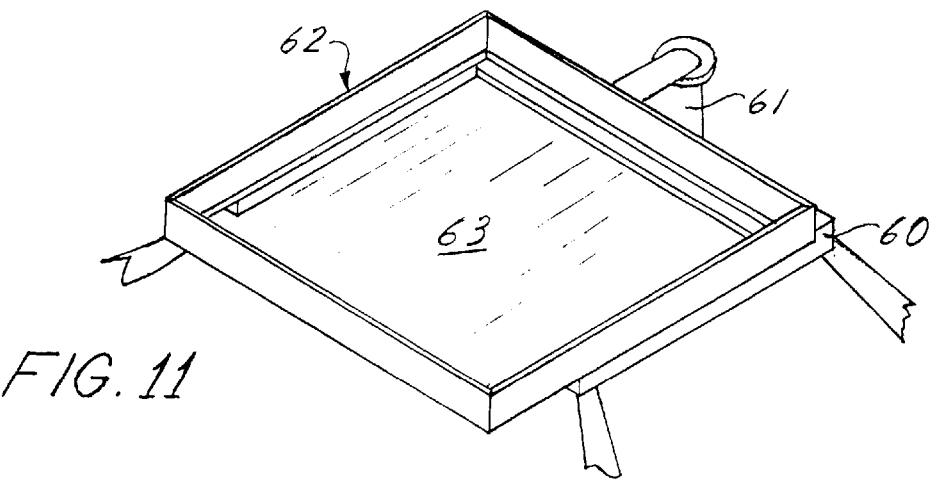
FIG. 11 is a fragmentary perspective view of a U-shaped base member of a stand assembly of the invention used with a magnifier.

FIG. 11 shows mount 61 attaching magnifier 62 with magnifying glass 63 across the two opposed outer end sections of a U-shaped base member 60. Photography equipment may be mounted over the magnifier 62 or someone who needs a magnification for reading may use the stand assembly to simply hold magnifier 62 over the document being read.

While the stand assembly for an optical device has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A free-standing assembly for maintaining an optical device at a location spaced from a stand assembly supporting surface wherein said optical device includes a longitudinal image axis extending through objective lens means disposed at a distal end of a lens system for the optical device, said stand assembly comprising:

(a) base means, four leg members each having one end thereof mounted to project outwardly from a bottom side of said base means, and optical device mounting means for mounting said optical device to project outwardly from a top side of said base means opposite said leg members, (b) said base means including opposed outer sides and device support surface means on said top side opposite said leg members mounted to said bottom side, two opposed outer free end sections and two opposed edge portions defined by said opposed outer sides of said base means and extending along said device support surface means, (c) each said leg member including at an outer free end thereof foot means for defining a footprint between said leg members when the stand assembly is disposed in a free-standing condition on said stand assembly supporting surface, (d) said optical device mounting means being effective to support said optical device for said longitudinal image axis to intersect said footprint and at a location spaced outwardly from said device support surface means, and to suspend said objective lens means over either of the opposed edge portions of said base means when said assembly is in use.

2. A stand assembly as defined in claim 1 wherein said optical device mounting means includes universal pivotable coupling means for connecting said optical device to said device support surface means at a location above a device support mounting plane when the stand assembly is in a free-standing condition on a stand assembly supporting surface.

3. A stand assembly as defined in claim 2 wherein said universal pivotable coupling means includes a first section secured to said device support surface means and a second section pivotally connected to said first section, said second section includes means for detachably connecting said optical device to said universal pivotable coupling means.

4. A stand assembly as defined in claim 1 wherein said optical device mounting means includes coupling means secured to said base means for removably connecting said optical device to said device support surface means.

5. A stand assembly as defined in claim 1 wherein said device support surface means defines a device support mounting plane above which mounting plane said optical device is mounted, and said optical device mounting means is effective to suspend said distal end of the optical device for disposing said objective lens means below said device support mounting plane.

6. A stand assembly as defined in claim 1 wherein said optical device mounting means is effective to suspend said objective lens means over either of said opposed edge portions to intersect said longitudinal image axis of the optical device with said footprint when said stand assembly is disposed on said stand assembly supporting surface.

7. A stand assembly as defined in claim 1 wherein said optical device may be a photographic camera, a telescope, binoculars, a gunsight, a spotting scope, a medium format camera, a night vision viewing device, or a video camera.

8. A stand assembly as defined in claim 1 wherein said base means includes an intermediate optical device carrying section located between said two opposed outer free end sections, said intermediate carrying section having an optical device connecting point located between said two opposed outer free end sections and in a connecting point plane that is perpendicular to a device support mounting plane, said connecting point plane is between said two opposed edge portions of said base means and intersects said foot print, said optical device mounting means being effective to support said optical device on said intermediate optical device carrying section above said device support mounting plane, and said leg members extend outwardly from said base means below said device support mounting plane.

9. A stand assembly as defined in claim 8 wherein said two opposed outer free end sections each includes a projecting end portion which projects outwardly from said intermediate carrying section and outwardly from one of said opposed edge portions of said base means, each said projecting end portion includes a free end located to one side of said connecting point plane.

10. A stand assembly as defined in claim 9 wherein said base means has a structural configuration that has a base plan shape of a U, H, V, X, or I when viewed in a direction normal to said device support mounting plane.

11. A stand assembly as defined in claim 9 wherein a leg member extends outwardly from each free end of said projecting end portions and in a direction extending below and transverse to said device support mounting plane.

12. A stand assembly as defined in claim 8 wherein said leg members are substantially identical to each other with respect to their length and width dimensions and structural configurations.

13. A stand assembly as defined in claim 12 wherein said leg members are removably mounted to said base means and each said leg member includes means for adjusting its respective length dimension.

14. A stand assembly as defined in claim 8 wherein the structural configuration of said assembly is effective to accommodate an optical device which is a photographic camera having a body portion and a long focal length lens means, said optical device mounting means includes means for attaching the body portion of the camera to said intermediate carrying section at said connecting point between said two opposed edge portions with said lens means projecting below said device support mounting plane.

15. A free-standing stand assembly for maintaining an optical device at a location spaced from a stand assembly supporting surface wherein said optical device includes a longitudinal image axis extending through objective lens means disposed at a distal end of a lens system for the optical device, said stand assembly comprising:

(a) base means including opposed outer sides and defining a device support mounting plane along a top side, (b) said base means including device support surface means, two opposed outer free end sections, an intermediate optical device carrying section located between said two opposed outer free end sections, and two opposed edge portions defined by said opposed outer sides of said base means and extending along said device support surface means, (c) four leg members each having one and thereof mounted to project outwardly from a bottom side of said base means and including at an outer free end thereof foot means to define a footprint therebetween when the stand assembly is disposed in a free-standing condition on said stand assembly supporting surface, and (d) optical device mounting means for mounting said optical device to project outwardly from the top side of said base means opposite said leg members when said assembly is in use, (e) said optical device mounting means being effective to support said optical device on said device support surface means and to suspend said objective lens means over said footprint and over either of the opposed edge portions of said base means and between said two opposed outer free end sections.

16. A stand assembly as defined in claim 15 wherein said intermediate carrying section includes an optical device connecting point located between said two opposed outer free end sections, said optical device connecting point being located in a connecting point plane that is perpendicular to said device support mounting plane, said connecting point plane is between said two opposed edge portions of said base means and intersects said footprint when said assembly is in use, said optical device mounting means is effective to support said optical device on said intermediate optical device carrying section above said device support mounting plane, and said leg members extend outwardly from said base means below said device support mounting plane.

17. A stand assembly as defined in claim 15 wherein said base means includes an outer corner leg coupling surface each having means to mount a leg member thereto.

18. A stand assembly as defined in claim 15 wherein said base means includes at least a portion that has a U-shaped base plan structural configuration when viewed in a direction normal to said device support mounting plane.

19. A stand assembly as defined in claim 18 wherein said optical device is a photographic camera having adjustable lens means which projects outwardly from a camera body portion for providing a selected focal length to photograph an object located in a field of view within said footprint without obtaining an image of said foot means in a resultant photograph taken when said camera body portion is secured to said device support surface means.

20. A stand assembly as defined in claim 18 wherein each said leg member is removably connected to said base means.

* * * * *